US012342379B2

(12) United States Patent
Zhang et al.

(10) Patent No.: US 12,342,379 B2
(45) Date of Patent: Jun. 24, 2025

(54) FRAMEWORK FOR TWO-STEP RANDOM ACCESS CHANNEL PROCEDURE IN WIRELESS COMMUNICATIONS

(71) Applicant: Apple Inc., Cupertino, CA (US)

(72) Inventors: Yushu Zhang, Beijing (CN); Wei Zeng, San Diego, CA (US); Yuqin Chen, Shenzhen (CN); Dawei Zhang, Saratoga, CA (US); Fangli Xu, Beijing (CN); Haijing Hu, Beijing (CN); Haitong Sun, Irvine, CA (US); Hong He, Cupertino, CA (US); Yakun Sun, San Jose, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 17/023,317

(22) Filed: Sep. 16, 2020

(65) Prior Publication Data

US 2021/0100039 A1 Apr. 1, 2021

(30) Foreign Application Priority Data

Sep. 26, 2019 (CN) .......................... 201910918327.X

(51) Int. Cl.
*H04W 74/0833* (2024.01)
(52) U.S. Cl.
CPC ................ *H04W 74/0833* (2013.01)
(58) Field of Classification Search
CPC ........... H04W 74/0833; H04W 74/006; H04W 74/004; H04W 74/0866; H04W 72/044;

(Continued)

(56) References Cited

U.S. PATENT DOCUMENTS

2012/0002592 A1* 1/2012 Yang ............... H04B 7/155 455/7
2019/0110320 A1* 4/2019 Lee ............... H04W 72/0453
(Continued)

FOREIGN PATENT DOCUMENTS

CN 109892000 A 6/2019
CN 109892001 A 6/2019
(Continued)

OTHER PUBLICATIONS

ETSI, "3GPP TS 38.214 version 15.5.0 Release 15" (May 2019) (Year: 2019).*

(Continued)

*Primary Examiner* — Chuong M Nguyen
(74) *Attorney, Agent, or Firm* — Kowert, Hood, Munyon, Rankin & Goetzel, P.C.

(57) ABSTRACT

A device may wirelessly transmit a physical RACH, and a first message on a physical uplink shared channel (PUSCH), in a first step of a 2-step random access channel (RACH) procedure. The device may receive a second message on a physical downlink shared channel in response to successful detection of the first message, in a second step of the 2-step RACH procedure. When detection of the first message is unsuccessful, the device may be instructed to fall back to a 4-step RACH procedure. The device may be configured with one or more first message transmit opportunities (PO), one of which may include one or more PUSCH resource units (PRUs). Some of the communication parameters of the device may be configured to be common for each PO, while other communication parameters may be configured per PRU. Respective new Radio Network Temporary ID values may be defined for the first message and second message.

20 Claims, 7 Drawing Sheets

(58) Field of Classification Search
CPC ......... H04W 72/1268; H04W 72/0446; H04W 72/0453; H04W 72/1263; H04W 74/002; H04L 5/0048; H04L 5/001
See application file for complete search history.

(56) References Cited

U.S. PATENT DOCUMENTS

| | | | |
|---|---|---|---|
| 2019/0132882 A1 | 5/2019 | Li et al. | |
| 2019/0223157 A1 | 7/2019 | Hwang et al. | |
| 2019/0306765 A1 | 10/2019 | Cirik et al. | |
| 2020/0008240 A1* | 1/2020 | Golitschek Edler von Elbwart | ... H04W 72/0446 |
| 2020/0008270 A1* | 1/2020 | Zhang | ............ H04L 27/261 |
| 2020/0053779 A1* | 2/2020 | Jeon | ............ H04W 74/02 |
| 2020/0100297 A1* | 3/2020 | Agiwal | ............ H04W 52/365 |
| 2020/0205082 A1* | 6/2020 | Chen | ............ H04W 52/54 |
| 2020/0351801 A1* | 11/2020 | Jeon | ............ H04W 52/48 |
| 2021/0058207 A1* | 2/2021 | Lee | ............ H04L 5/0044 |
| 2021/0068073 A1* | 3/2021 | Sivavakeesar | ............ H04W 68/00 |
| 2021/0368554 A1* | 11/2021 | Ohseki | ............ H04W 74/0836 |

FOREIGN PATENT DOCUMENTS

| | | | | |
|---|---|---|---|---|
| EP | 3993529 A1 * | 5/2022 | ........... | H04L 5/0048 |
| KR | 10-2018-0117620 A | 10/2018 | | |
| WO | 2018/085205 | 5/2018 | | |
| WO | 2019/064768 A1 | 4/2019 | | |
| WO | WO2020261463 * | 6/2019 | | |

OTHER PUBLICATIONS

Vivo "Views on 2-step RACH design", 3GPP R1-1901671, Feb. 25-Mar. 1, 2019 (Year: 2019).*

Qualcomm "Channel Structure for Two Step RACH", 3GPP R1-1902977, Feb. 25-Mar. 1, 2019 (Year: 2019).*

Ericsson "Channel Structure for Two-Step RACH", 3GPP R1-1907752, May 13-17, 2019 (Year: 2019).*

First Office Action for CN Patent Application No. 201910918327.X; Dec. 3, 2021.

ZTE et al. "On 2-Step RACH Procedures"; 3GPP TSG RAN WG1 Meeting #96bis; R1-1903879; Xi'an, China; Apr. 8-12, 2019.

Extended European Search Report for EP 20197679.2, dated Feb. 24, 2021, 12 pages.

Qualcomm Inc "Channel Structure for Two-Step RACH", 3GPP TSG RAN WG1 #96 R1-1902977, Athens, Greece, Feb. 25, 2019, 10 pages.

Ericsson "Procedure for Two-Step RACH", 3GPP TSG-RAN WG1 Meeting #96 R1-1902823, Athens, Greece, Feb. 25, 2019, 6 pages.

Vivo "Views on 2 Step RACH design", 3GPP TSG RAN WG1 #96 R1-1901671, Athens, Greece, Feb. 25, 2019, 5 pages.

Apple "Consideration on MsgB Content", 3GPP TSG RAN WG1 #107 R2-1909870, Prague, Czech Republic, Aug. 26, 2019, 5 pages.

Ericsson "Channel Structure for Two-Step RACH", 3GPP TSG RAN WG1 #97 R1-1907752, Reno, USA, May 13, 2019, 10 pages.

ZTE et al. "Further discussions on the channel structure for msgA", 3GPP TSG RAN WG1 #97 R1-1905989, Reno, USA, May 13, 2019, 13 pages.

"3rd Generation Partnership Project; Technical Specification Group Radio Access Network; Study on NR-based access to unlicensed spectrum (Release 16)", 3GPP TR 38.889, V16.0.0, Feb. 2018, 119 pages.

CMCC "Discussion on Procedure of 2-Step 6, 7 RACH", 3GPP TSG RAN WG1 #90 R1-1912532, Reno, USA, Nov. 18, 2019, 6 pages.

Notice of Preliminary Rejection for KR Patent Application No. 10-2020-0122909; Sep. 13, 2021; 13 pages.

LG Electronics Inc "2-Step RACH procedure for NR-U"; 3GPP TSG RAN WG2 #104 R2-1818098; Spokane, USA; Nov. 12-16, 2018; 4 pages.

* cited by examiner

```
MsgAPUSCHOpportunityConfig ::=     SEQUENCE {
    msgAPUSCHOpportunityId             MsgAPUSCHOpportunityId,
    DMRS-UplinkConfig                  DMRS-UplinkConfig,
    mcs-Table                          ENUMERATED {qam256, qam64LowSE}              OPTIONAL,   -- Need S
    mcs-TableTransformPrecoder         ENUMERATED {qam256, qam64LowSE}              OPTIONAL,   -- Need S
    uci-OnPUSCH                        SetupRelease { CG-UCI-OnPUSCH }              OPTIONAL,   -- Need M
    resourceAllocation                 ENUMERATED { resourceAllocationType0, resourceAllocationType1, dynamicSwitch },
    rbg-Size                           ENUMERATED {config2}                         OPTIONAL,   -- Need S
    transformPrecoder                  ENUMERATED {enabled, disabled}               OPTIONAL,   -- Need S
    periodicity                        ENUMERATED {
        sym2, sym7, sym1x14, sym2x14, sym4x14, sym5x14, sym8x14, sym10x14, sym16x14, sym20x14,
        sym32x14, sym40x14, sym64x14, sym80x14, sym128x14, sym160x14, sym256x14, sym320x14, sym512x14,
        sym640x14, sym1024x14, sym1280x14, sym2560x14, sym5120x14,
        sym6, sym1x12, sym2x12, sym4x12, sym5x12, sym8x12, sym10x12, sym16x12, sym20x12, sym32x12,
        sym40x12, sym64x12, sym80x12, sym128x12, sym160x12, sym256x12, sym320x12, sym512x12, sym640x12,
        sym1280x12, sym2560x12
    },
    timeDomainOffset                   INTEGER (0..5119),
    msgATimer                          INTEGER (1..64)                              OPTIONAL,   -- Need R
}

MsgAPUSCHResourceConfig ::=        SEQUENCE {
    msgAPUSCHResourceId                MsgAPUSCHResourceId,
    prach-ResourceMsgA                 PRACH-ResourceMsgA,
    timeDomainAllocation               INTEGER (0..15),
    frequencyDomainAllocation          BIT STRING (SIZE(18)),
    antennaPort                        INTEGER (0..3),
    dmrs-SeqInitialization             INTEGER (0..1)                               OPTIONAL,   -- Need R
    mcsAndTBS                          INTEGER (0..31),
}
```

FIG. 7

FRAMEWORK FOR TWO-STEP RANDOM ACCESS CHANNEL PROCEDURE IN WIRELESS COMMUNICATIONS

PRIORITY CLAIM

This application claims benefit of priority to Chinese Patent Application No. 201910918327.X titled "Framework for Two-Step Random Access Channel Procedure in Wireless Communications", filed on Sep. 26, 2019, which is hereby incorporated by reference as though fully and completely set forth herein.

FIELD OF THE INVENTION

The present application relates to wireless communications, and more particularly to a framework for a two-step random access channel (RACH) procedure in wireless communications, for example in 3GPP New Radio (NR) communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standards moving beyond the current International Mobile Telecommunications-Advanced (IMT-Advanced) Standards is called 5th generation mobile networks or 5th generation wireless systems, referred to as 3GPP NR (otherwise known as 5G-NR for 5G New Radio, also simply referred to as NR). NR proposes a higher capacity for a higher density of mobile broadband users, also supporting device-to-device, ultra-reliable, and massive machine communications, as well as lower latency and lower battery consumption, than current LTE standards.

When switched on, a UE typically begins searching for a network. There is a possibility that there are many networks or many frequencies from different network operators to which the UE may connect. Therefore, the UE needs to synchronize to each frequency and determine to which of those frequencies the UE will connect. The UE performs this by undergoing an initial synchronization process. Once the UE has completed the synchronization process, it begins to use system information to establish wireless communications with (in) the network. LTE system information includes the Master Information Block (MIB) and a number of System Information Blocks (SIBs). The MIB is broadcast on the Physical Broadcast Channel (PBCH), while SIBs are sent on the Physical Downlink Shared Channel (PDSCH) through Radio Resource Control (RRC) messages (i.e. via RRC messaging/signaling). An SI message can contain one or several SIBs.

The MIB is the initial system information used by the UE once the UE has achieved downlink synchronization, and carries the most essential information that is needed for the UE to acquire other information from the cell. The various different SIBs (e.g., LTE includes five different types of SIBs, SIB1-SIB5) carry the remaining information needed by the UE to conduct wireless communications in the cell. LTE system information (SI) is transmitted in the broadcast control logical channel (BCCH). Generally, BCCH messages are carried on the Downlink Shared Channel (DL-SCH) and transmitted on the Physical Downlink Shared Channel (PDSCH) in conjunction with a downlink control information (DCI) message transmitted on the Physical Downlink Control Channel (PDCCH) that indicates format and resource allocation of the PDSCH transmission. SI-RNTI, the Radio Network Temporary Identity (RNTI) of the system information, scrambles this DCI message. The exception is the initial system information conveyed in the master information block (MIB), which, as mentioned above, is carried on the BCH transport channel and transmitted on the PBCH.

Once the SIBs (at least SIB1) have been read, the UE performs a random access channel (RACH) procedure to initiate data transfer with (in) the network. At this stage, there may be many other UEs in the same area (e.g. in the same cell) performing similar procedures, in which case there is a possibility of collision among the requests coming from various other UEs. Such a RACH procedure is referred to as a contention-based RACH procedure. However, a network can inform a UE to use a unique identity to prevent its request from colliding with requests coming from other UEs. Such a RACH procedure is referred to as contention-free RACH procedure or non-contention-based RACH procedure. A contention-free RACH procedure is performed for an intra-system handover request, or a synchronization request for downlink data transfer (upon losing synchronization during downlink data transfer). A contention-based RACH procedure is performed for moving from a radio resource control (RRC) Idle state to an RRC connected state, a synchronization request for uplink data transfer (upon losing synchronization during uplink data transfer), or an RRC connection reestablishment request. The overall functionality and structure of the MIB/SIB in NR is almost the same as it is in LTE, with some differences.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. The UEs, which may be mobile telephones or smart phones, portable gaming devices, laptops, wearable devices, PDAs, tablets, portable Internet devices, music players, data storage devices, or other handheld devices, etc. are generally powered by a portable power supply, e.g., a battery and may have multiple radio interfaces that enable support of multiple radio access technologies (RATs) as defined by the various wireless communication standards (LTE, LTE-A, NR, Wi-Fi, BLUETOOTH™, etc.). There are ongoing efforts not only to reduce power consumption required to perform wireless communications in order to improve the battery life of wireless devices, but also to achieve efficient use of wireless communication resources and thereby increase system efficiency. One such effort focuses on reducing the number of communication steps required to perform a RACH procedure.

Other corresponding issues related to the prior art will become apparent to one skilled in the art after comparing such prior art with the disclosed embodiments as described herein.

SUMMARY OF THE INVENTION

Embodiments are presented herein of, inter alia, of methods and procedures for support in various devices, e.g. wireless communication devices, to perform random access channel (RACH) procedures with a reduced number of steps, e.g. to perform a 2-step RACH procedure during 3GPP communications, e.g. during LTE and/or NR communications. Embodiments are further presented herein for wireless communication systems containing wireless communication devices (UEs) and/or base stations and access points (APs) communicating with each other within the wireless communication systems.

In some embodiments, a device, e.g. a wireless communication device or UE, may wirelessly communicate on a network, and may transmit to a base station, as part of a first step of a 2-step RACH procedure, a physical random access channel (PRACH) and a first message (e.g. MsgA) on a physical uplink shared channel (PUSCH). The UE may receive from the base station, as part of a second step of the 2-step RACH procedure, a second message (e.g. MsgB) on a physical downlink shared channel (PDSCH) in response to the first message being successfully detected by the base station. The device may be configured with one or more opportunities to transmit the first message, with one of the opportunities including one or more PUSCH resource units (PRUs). In some embodiments, one or more of a first set of communication parameters for (or associated with) the device may be configured to be common for each opportunity of the one or more opportunities, while one or more of a second set of communication parameters for (or associated with) the device may be configured per PRU. That is, different PRUs may be configured with the same parameters or they may be configured with different parameters.

The first set of parameters may include modulation and coding scheme (MCS) table parameters, periodicity parameters, offset parameters, demodulation reference signal (DMRS) configuration parameters, waveform parameters, power control parameters, and/or timer parameters. The second set of parameters may include MCS parameters, antenna port parameters, DMRS scramble ID parameters, and/or frequency resource allocation and associated PRACH resource parameters.

In some embodiments, the first message may be associated with a specific value of a radio network temporary identifier (RNTI). The specific value may be determined based on time and frequency resources associated with the PUSCH, time and frequency resources associated with the PRACH, and/or a preamble index. Alternatively, the specific value may be determined through radio resource control. The specific value may be calculated according to a hash function of a first symbols index of the PUSCH resources, a slot index of PUSCH within a transmission frame, a first resource block index of PUSCH resources, and/or a preamble index the device uses to transmit PRACH. The device in idle mode may use the specific value as a cell-RNTI value following a RACH procedure. Furthermore, the device may use the specific value to determine whether a phase tracking reference signal (PT-RS) associated with the first message is present or not present. The determination may include assuming that the PT-RS is present when the RNTI has the specific value, or assuming that the PT-RS is not present when the RNTI has the specific value. In addition, the second message may be used to indicate a cell radio network temporary identifier (C-RNTI) value to the device.

In some embodiments, when a collision between the first message and the PRACH occurs in different component carriers (CCs), either the first message or the PRACH may be dropped by the UE. When a collision between the first message and other uplink signals occurs in different CCs, the UE may drop the other uplink signals. When a collision between the first message and a physical uplink control channel (PUCCH) occurs in a same CC, either the PUCCH or the first message may be dropped by the UE, or the uplink control information may be transmitted in the PUSCH. When a collision between the first message and a sounding reference signal (SRS) occurs in a same CC, the UE may drop either the first message or the SRS.

In some embodiments, the device may receive instruction from the base station to fall back to a 4-step RACH procedure in response to the first message not being successfully detected. For example, when the first message (e.g. MsgA) and an uplink message that is part of a 4-step RACH procedure (e.g. Msg3) share the same control parameters, and the PRACH is not decoded correctly, the base station may control the UE to fall back to a 4-step RACH.

In some embodiments, the second message may also be associated with a specific RNTI value. The specific value may be determined based on time and frequency resources associated with the PUSCH, time and frequency resources associated with the PRACH, a preamble index, and/or uplink carrier type. Alternatively, the specific value may be determined through RRC. The specific value may be calculated according to a function of the first symbols index of a PUSCH occasion, the first slot index of a PUSCH occasion within a frame, the index of a PUSCH resource in the frequency domain, and/or the carrier type, for example a Normal Uplink (NUL) carrier or Supplementary Uplink (SUL) carrier. The device may use the specific value to determine whether a phase tracking reference signal (PT-RS) associated with the second message is present or not present. The determination may include assuming that the PT-RS is present when the RNTI has the specific value, or assuming that the PT-RS is not present when the RNTI has the specific value.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 7 shows an exemplary code segment listing possible radio resource control (RRC) parameters for a 2-step RACH uplink message (MsgA) physical uplink shared channel (PUSCH), according to some embodiments.

Figure 1:
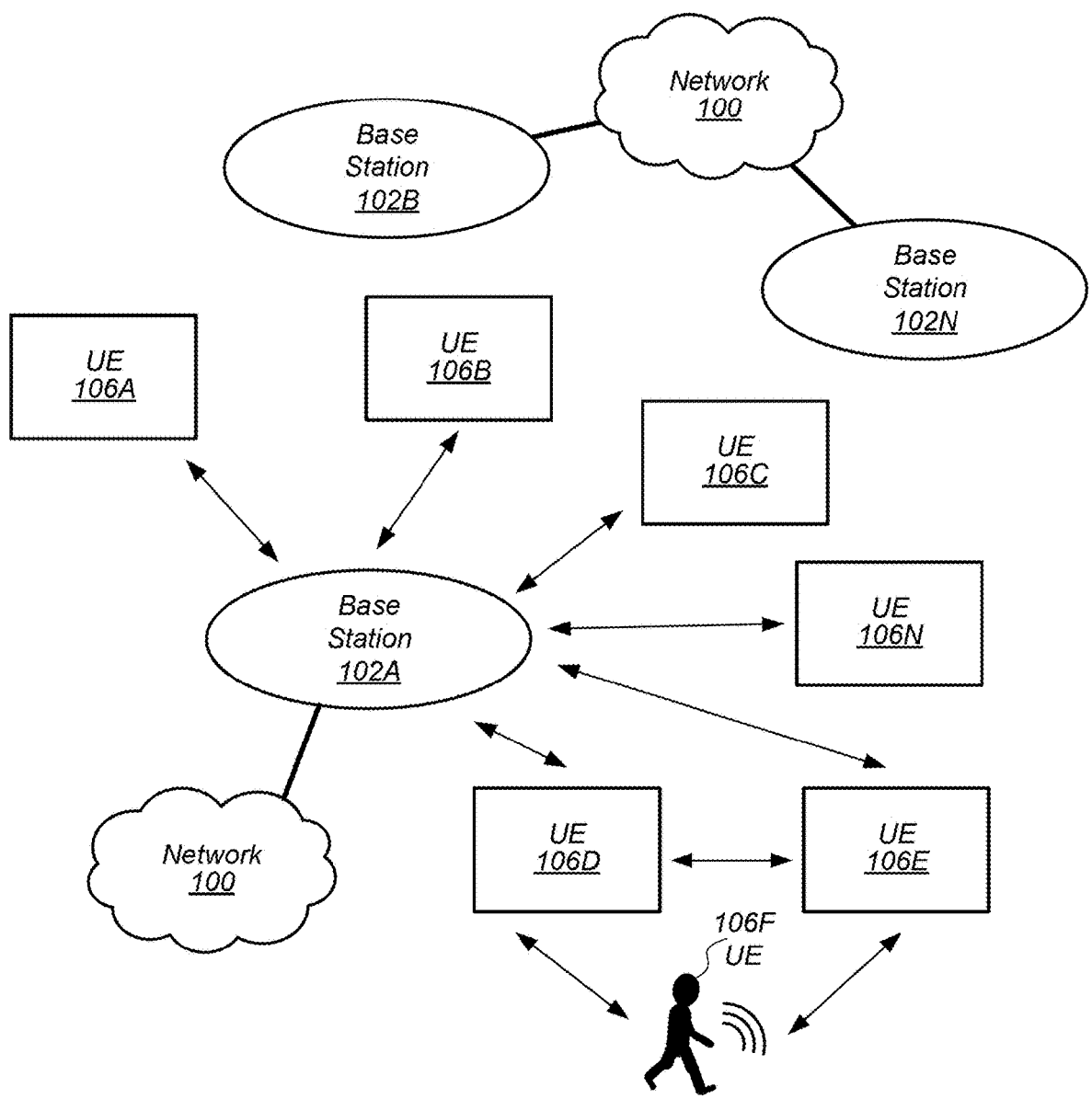
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
AP: Access Point.
APN: Access Point Name.
APR: Applications Processor
BS: Base Station
BSR: Buffer Size Report
BSSID: Basic Service Set Identifier
CBRS: Citizens Broadband Radio Service
CBRSD: Citizens Broadband Radio Service Device
CCA: Clear Channel Assessment
CMR: Change Mode Request
CS: Circuit Switched
DL: Downlink (from BS to UE)
DMRS: Demodulation Reference Signal
DSDS: Dual SIM Dual Standby
DYN: Dynamic
EDCF: Enhanced Distributed Coordination Function
FDD: Frequency Division Duplexing
FO: First-Order state
FT: Frame Type
GAA: General Authorized Access
GPRS: General Packet Radio Service
GSM: Global System for Mobile Communication
GTP: GPRS Tunneling Protocol
IMS: Internet Protocol Multimedia Subsystem
IP: Internet Protocol
IR: Initialization and Refresh state
KPI: Key Performance Indicator
LAN: Local Area Network
LBT: Listen Before Talk
LQM: Link Quality Metric
LTE: Long Term Evolution
MNO: Mobile Network Operator
NB: Narrowband
NUL: Normal Uplink
OOS: Out of Sync
PAL: Priority Access Licensee
PDCP: Packet Data Convergence Protocol
PDN: Packet Data Network
PDU: Protocol Data Unit
PGW: PDN Gateway.
PLMN: Public Land Mobile Network
PRACH: Physical Random Access Channel
PSD: Power Spectral Density
PSS: Primary Synchronization Signal
PT: Payload Type
PUCCH: Physical Uplink Control Channel
PUSCH: Physical Uplink Shared Channel
QBSS: Quality of Service Enhanced Basic Service Set
QI: Quality Indicator
RAR: Random Access Channel Response
RAT: Radio Access Technology
RF: Radio Frequency
RACH: Random Access Channel.
ROHC: Robust Header Compression
RRC: Radio Resource Control
RTP: Real-time Transport Protocol.
RTT: Round Trip Time
RX: Reception/Receive
SAS: Spectrum Allocation Server
SID: System Identification Number
SIM: Subscriber Identity Module
SGW: Serving Gateway
SRS: Sounding Reference Signal
SSS: Secondary Synchronization Signal
SUL: Supplementary Uplink
TBS: Transport Block Size
TCP: Transmission Control Protocol
TDD: Time Division Duplexing
TX: Transmission/Transmit
UCI: Uplink Control Information
UE: User Equipment
UL: Uplink (from UE to BS)
UMTS: Universal Mobile Telecommunication System
USIM: UMTS Subscriber Identity Module
WB: Wideband
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
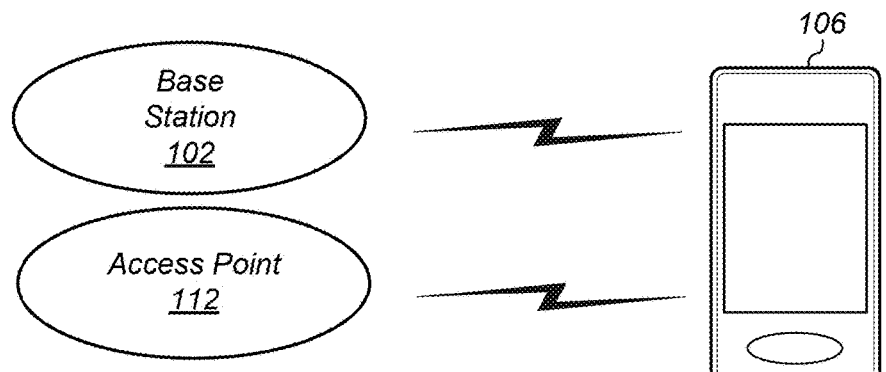
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may operate to perform a 2-step random access channel (RACH) procedure according to various embodiments disclosed herein.

The base station 102A may be a base transceiver station (BTS) or cell site, and may include hardware that enables wireless communication with the UEs 106A through 106N. The base station 102A may also be equipped to communicate with a network 100, e.g., a core network of a cellular service provider, a telecommunication network such as a public switched telephone network (PSTN), and/or the Internet, neutral host or various CBRS (Citizens Broadband Radio Service) deployments, among various possibilities. Thus, the base station 102A may facilitate communication between the user devices and/or between the user devices and the network 100. In particular, the cellular base station 102A may provide UEs 106 with various telecommunication capabilities, such as voice, SMS and/or data services. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if a base station(s) 102 are implemented in the context of LTE, it may alternately be referred to as an 'eNodeB' or 'eNB'. Note that if the base station 102A is implemented in the context of 5G NR, it may alternately be referred to as 'gNodeB' or 'gNB'. In some embodiments, the base station (s) 102 may perform a 2-step RACH procedure, as described herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHZ) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to Citizens Broadband Radio Service (CBRS). Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services. Base station 102A and other similar base stations (such as base stations 102B . . . 102N) operating according to the same or a different cellular communication standard may thus be provided as a network of cells, which may provide continuous or nearly continuous overlapping service to UEs 106A-106N and similar devices over a geographic area via one or more cellular communication standards.

Thus, while base station 102A may act as a "serving cell" for UEs 106A-106N as illustrated in FIG. 1, each one of UE(s) 106 may also be capable of receiving signals from (and possibly within communication range of) one or more other cells (which might be provided by base stations 102B-102N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-102B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

As mentioned above, UE(s) 106 may be capable of communicating using multiple wireless communication standards. For example, a UE might be configured to communicate using any or all of a 3GPP cellular communication standard (such as LTE or NR) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE(s) 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, UE(s) 106 may also communicate with Network 100, through one or more base stations or through other devices, stations, or any appliances not explicitly shown but considered to be part of Network 100. UE(s) 106 communicating with a network may therefore be interpreted as the UEs 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

Furthermore, as also illustrated in FIG. 1, at least some of the UE(s) 106, e.g. 106D and 106E may represent vehicles communicating with each other and with base station 102A, via cellular communications such as 3GPP LTE and/or 5G-NR for example. In addition, UE 106F may represent a pedestrian who is communicating and/or interacting with the vehicles represented by UEs 106D and 106E in a similar manner. Further aspects of vehicles communicating in a network exemplified in FIG. 1 are disclosed in the context of vehicle-to-everything (V2X) communications such as the communications specified by 3GPP TS 22.185 V 14.3.0, among others.

FIG. 2 illustrates an exemplary user equipment 106 (e.g., one of the devices 106A through 106N) in communication with the base station 102 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include a shared radio for communicating using either of LTE or CDMA2000 1×RTT or NR, and separate radios for communicating using each of Wi-Fi and BLUETOOTH™. Other configurations are also possible.

Figure 3:
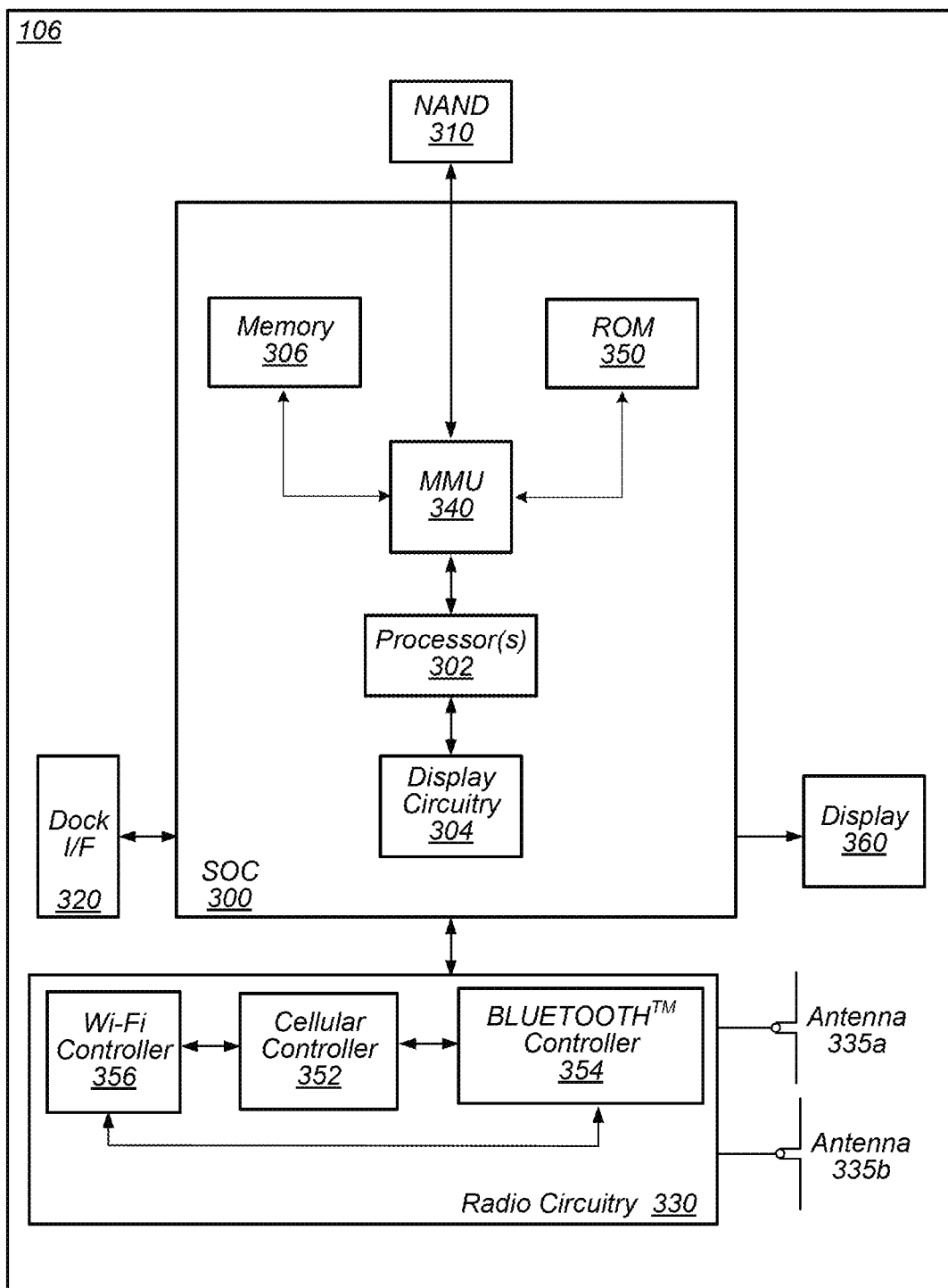
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station(s) 102) may include hardware and software components for implementing methods for at least UE 106 to perform a 2-step RACH procedure as further detailed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform a 2-step RACH procedure according to various embodiments disclosed herein. Processor(s) 302 may also implement various other applications and/or end-user applications running on UE 106.

Figure 5:
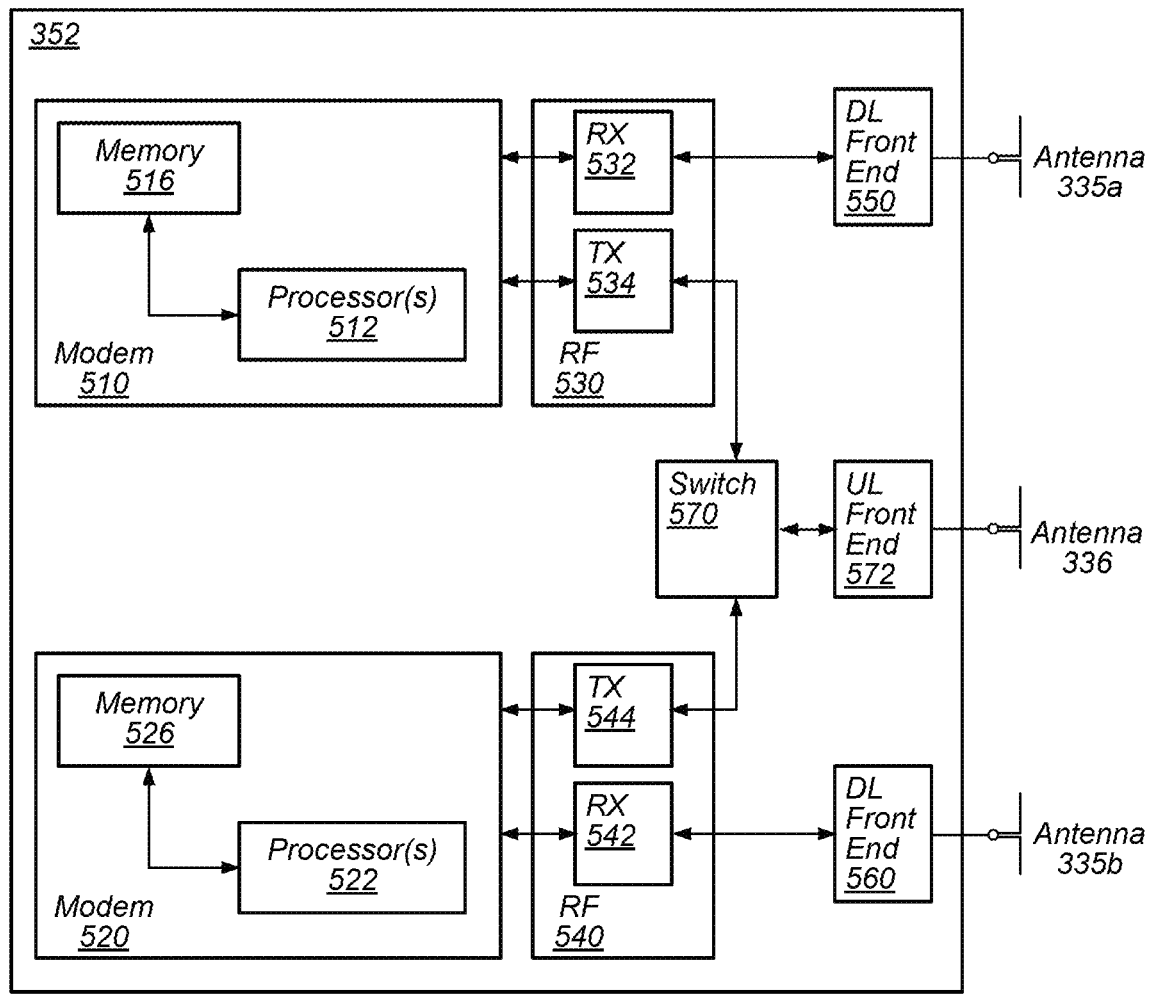
FIG. 5 shows an exemplary, simplified block diagram illustrative of cellular communication circuitry, according to some embodiments.

In some embodiments, radio circuitry 330 may include separate controllers dedicated to controlling communications for various respective RAT standards. For example, as shown in FIG. 3, radio circuitry 330 may include a Wi-Fi controller 356, a cellular controller (e.g. LTE and/or NR controller) 352, and BLUETOOTH™ controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments have fewer or more similar controllers for various different RATs that may be implemented in UE device 106. For example, at least one exemplary block diagram illustrative of some embodiments of cellular controller 352 is shown in FIG. 5 and will be further described below.

Figure 4:
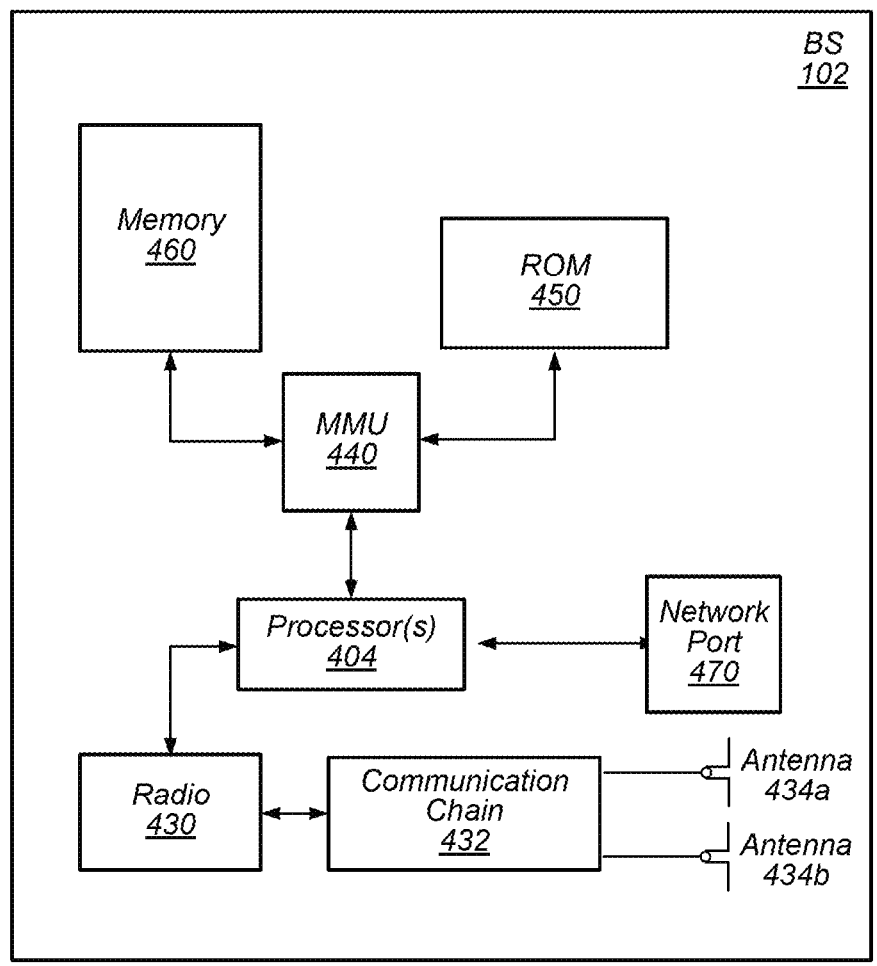
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas, (e.g. illustrated by antennas 434a and 434b) for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna(s) 434. Antenna(s) 434 may be configured to operate as a wireless transceiver and may be further configured to communicate with UE devices 106 via radio circuitry 430. The antenna(s) 434 may communicate with the radio circuitry 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (or NR for short), WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device that performs a 2-step RACH procedure as disclosed herein. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g. it may include at least one Ethernet port, and radio 430 may be designed to communicate according to the Wi-Fi standard. Base station 102 may operate according to the various methods and embodiments as disclosed herein for performing a 2-step RACH procedure with a UE.

FIG. 5—Block Diagram of Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

RACH Procedures

As previously mentioned, once a UE is switched on it typically begins searching for a network, synchronizes to detected frequencies, and determines to which of those frequencies to connect. Once the UE has completed the synchronization process, the UE uses system information to perform a random access channel (RACH) procedure to initiate data transfer within (or with) the network. In present day systems, according to current 3GPP communications standards, e.g. Rel-15 (release 15) of the 3GPP communication standards, the RACH procedure nominally involves a 4-step process. In contrast to the 4-step RACH procedure, a 2-Step RACH procedure (or operation) is being proposed. In comparison to the 4-step RACH procedure, a 2-step RACH procedure may help reduce latency.

Figure 6:
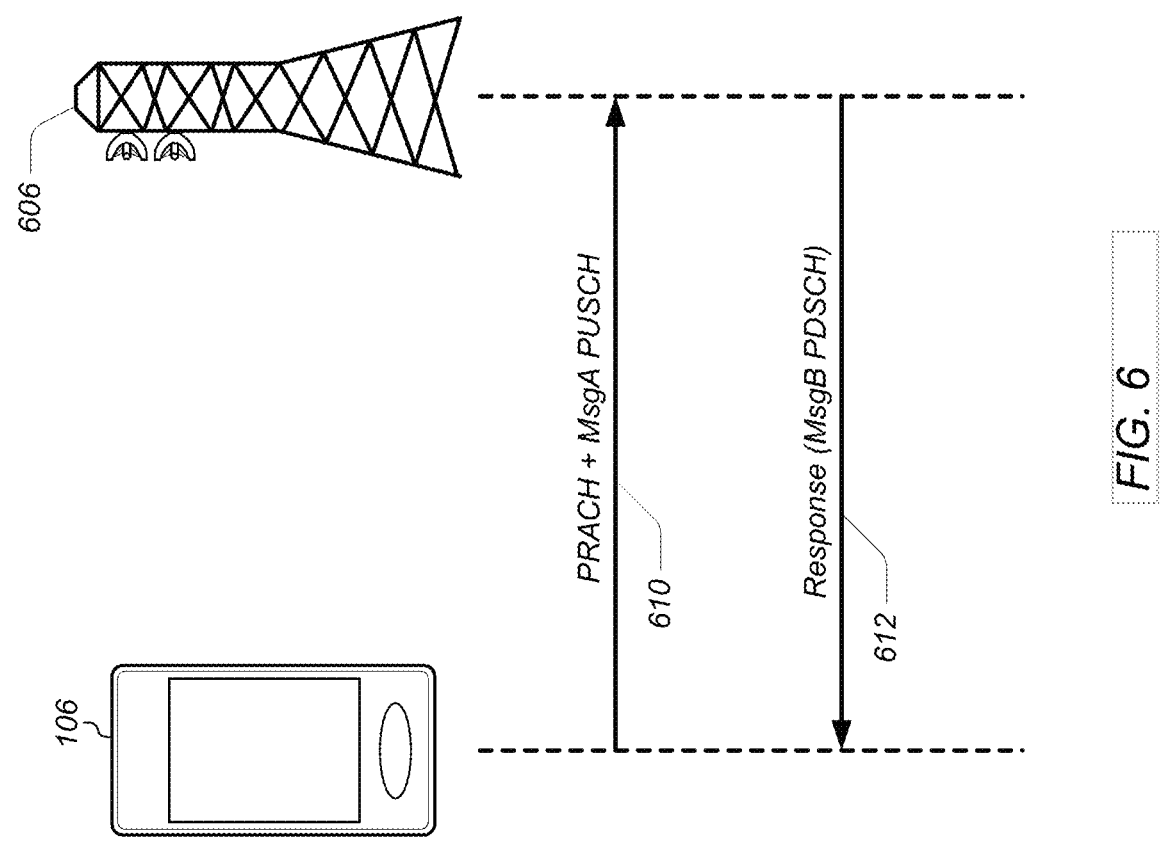
FIG. 6 shows an exemplary signaling diagram illustrating a two-step random access channel (RACH) signaling procedure between a base station and a mobile device.

FIG. 6 shows an exemplary signaling diagram illustrating a two-step RACH signaling procedure between a base station 606 and a mobile device 106. As shown in FIG. 6, in a first step 610 the UE 106 may transmit a Physical Random Access Channel (PRACH), and may also transmit a Physical Uplink Shared Channel (PUSCH) in a designated message referred to as "MsgA" to the base station (e.g., gNB) 606. In the second step 612, the base station 606 may transmit a response in a designated message referred to as "MsgB" to the UE 106, in response to successfully detecting the PRACH and MsgA in the first step 610. Reducing the number of steps in the RACH procedure from four (4) to two (2) raises new issues that need to be considered.

First Issue—Control Signaling for MsgA (PUSCH)

MsgA PUSCH may be used by a UE in idle mode as well as a UE in connected mode. Transmission of the PUSCH may therefore rely on a set of parameters which have to be appropriately configured. Accordingly, a UE may be configured with one or multiple MsgA PUSCH opportunities (PO), one of which may include one or multiple PUSCH resource units (PRU). In some embodiments, certain parameters may be configured in common for each PO. Such parameters may include, without being limited to, Modulation and Coding Scheme (MCS) table parameters, periodicity parameters, offset parameters, Demodulation Reference Signal (DMRS) configuration parameters, waveform parameters, power control parameters and timer parameters. Additionally, certain parameters may be configured per PRU, in which case those parameters may be configured either in common or differently per PRU as desired. Such parameters may include, without being limited to, MCS parameters, antenna port parameters, DMRS scramble ID parameters, frequency resource allocation and associated PRACH resource parameters. In some embodiments, some of the above parameters may be configured in PUSCH configuration or in (an) other structure(s). FIG. 7 shows an exemplary code segment listing possible radio resource control (RRC) parameters for a 2-step RACH uplink message, e.g. for a MsgA PUSCH, according to some embodiments. The parameters and code segment shown in FIG. 7 may be used in defining RRC signaling for a 2-step RACH procedure in 3GPP. For example, the code segment may be a proposed addition to 3GPP Technical Specification 38.331, section 6.2.3.

Second Issue—Radio Network Temporary Identifier (RNTI) for MsgA PUSCH

For a 4-step RACH, the RNTI of the first PUSCH message (e.g. Msg3) is configured by the network/base station (e.g. by gNB) via a downlink message (e.g. Msg2). However, in a 2-step RACH procedure, MsgA is transmitted prior to any downlink messages. Therefore, the RNTI has to be defined for MsgA PUSCH, and retransmission(s) of MsgA PUSCH also needs to be defined. In order to address the issues relating to the RNTI for MsgA PUSCH, a new RNTI may be defined for MsgA PUSCH. The new RNTI may be referenced as MsgA-RNTI. At least three possible options for MsgA-RNTI may be considered.

A first option may be to determine the RNTI based on time and frequency resources associated with the PUSCH, and/or by time and frequency resources associated with the PRACH, and/or by a preamble index. In some embodiments, the RNTI may be calculated defined by the function:

$$\text{MsgA-RNTI} = \text{func}(s,t,f,p),$$

where, "func" indicates a hash function, "s" indicates the first symbols index of the PUSCH resources, "t" indicates the slot index of the PUSCH within a frame, "f" refers to the first resource block index of the PUSCH resources, and "p" denotes the preamble index the UE uses to transmit the PRACH. A second option may include configuring the RNTI by RRC, while a third option may include a combination of the first and second options, where the RNTI may be determined by an RRC parameter and/or by the time and frequency resources associated with the PUSCH, and/or by the time and frequency resources associated with the PRACH, and/or by the preamble index. For idle mode, the UE may use the MsgA-RNTI as cell-RNTI (C-RNTI) after a RACH procedure, or the C-RNTI may be indicated by (or in) the MsgB.

Furthermore, the dynamic presence of the phase tracking reference signal (PT-RS) for MsgA PUSCH may be predefined by taking into consideration the new RNTI, e.g. the MsgA-RNTI. According to a first option, the UE may be configured to assume that no PT-RS transmission is present if the RNTI (value) equals MsgA-RNTI. For example, in reference to the 3GPP Technical Specification 38.214, v15.6.0, section 6.2.3.2, when transform precoding is enabled and the UE is configured with the higher layer parameter transformPrecoderEnabled in PTRS-UplinkConfig, the UE may assume no PT-RS is present when the RNTI equals MsgA-RNTI. According to a second option, the UE may be configured to assume presence of the PT-RS if the RNTI (value) equals MsgA-RNTI. For example, in reference to the 3GPP Technical Specification 38.214, v15.6.0, section 6.2.3, when the UE is not configured with the higher layer parameter phase TrackingRS in DMRS-UplinkConfig, the UE may assume PTRS is present when RNTI equals MsgA-RNTI.

Third Issue—UE Behavior when MsgA PUSCH Collides with Other Signals

Operation of the UE may be configured to account for the possibility of the MsgA PUSCH uplink transmission colliding with other signals in either the same component carrier (CC) or in a different CC. In other words, the UE may need to be aware of possible collisions when MsgA PUSCH and other signals are scheduled in the same symbol or slot, transmitted in either a different CC(s) or the same CC(s). If two different PUSCHs are transmitted in the same CC, Peak Average Power Ratio (PAPR) may increase, which can impact uplink coverage. Thus, in the same CC, it is preferable to keep a low PAPR, and in order to keep the PAPR low, simultaneous transmission of two different uplink channels is preferably avoided. When PUSCH and other signals are transmitted in different CCs and with different beams, the UE may not be able to be able to generate multiple beams simultaneously, as the UE may be able to generate only a single beam in the time domain. It is therefore also preferable to avoid simultaneous multiple-beam operation.

Accordingly, in some embodiments, a set of rules may be defined to govern operation of the UE when an MsgA (PUSCH) transmission collides with other uplink signals of the UE. When the collision between an MsgA PUSCH and the PRACH occurs in different CCs, either the MsgA PUSCH or the PRACH may be dropped by the UE. When the collision between an MsgA PUSCH and other signal(s) other than the PRACH occurs in different CCs, the other signals may be dropped by the UE. When a collision between an MsgA PUSCH and the Physical Uplink Control Channel (PUCCH) occurs in the same CC, the UE may drop the PUCCH, or alternatively drop the the MsgA PUSCH, or in the further alternative the UCI to be carried by the PUCCH may be transmitted in the PUSCH. When a collision between an MsgA PUSCH and the Sounding Reference Signal (SRS) occurs in the same CC, either the SRS or the MsgA PUSCH may be dropped by the UE.

Fourth Issue—Power Control for MsgA PUSCH

Power control parameters and transmission power need to be determined/configured for initial transmission and/or retransmission of the MsgA PUSCH. For the open loop power control parameters, e.g. PO, alpha, etc., MsgA PUSCH may be configured with separate parameters by RRC. Alternatively, the control parameters, for example the power control parameters may be common for MsgA PUSCH and Msg3 PUSCH, where the latter is part of a 4-step RACH procedure. For closed loop power control parameters, e.g. power ramping step, etc., MsgA PUSCH may be configured with separate parameters by RRC, or alternatively it may be configured with the same parameters as the Msg3 PUSCH of the 4-step RACH procedure. The network (or bases station, e.g. gNB) may control the UE to fallback to a 4-step RACH procedure in case MsgA and Msg3 share the same power control parameters and during the course of a 2-step RACH procedure the PRACH is successfully detected but MsgA is not decoded correctly. This is illustrated in FIG. 8.

Figure 8:
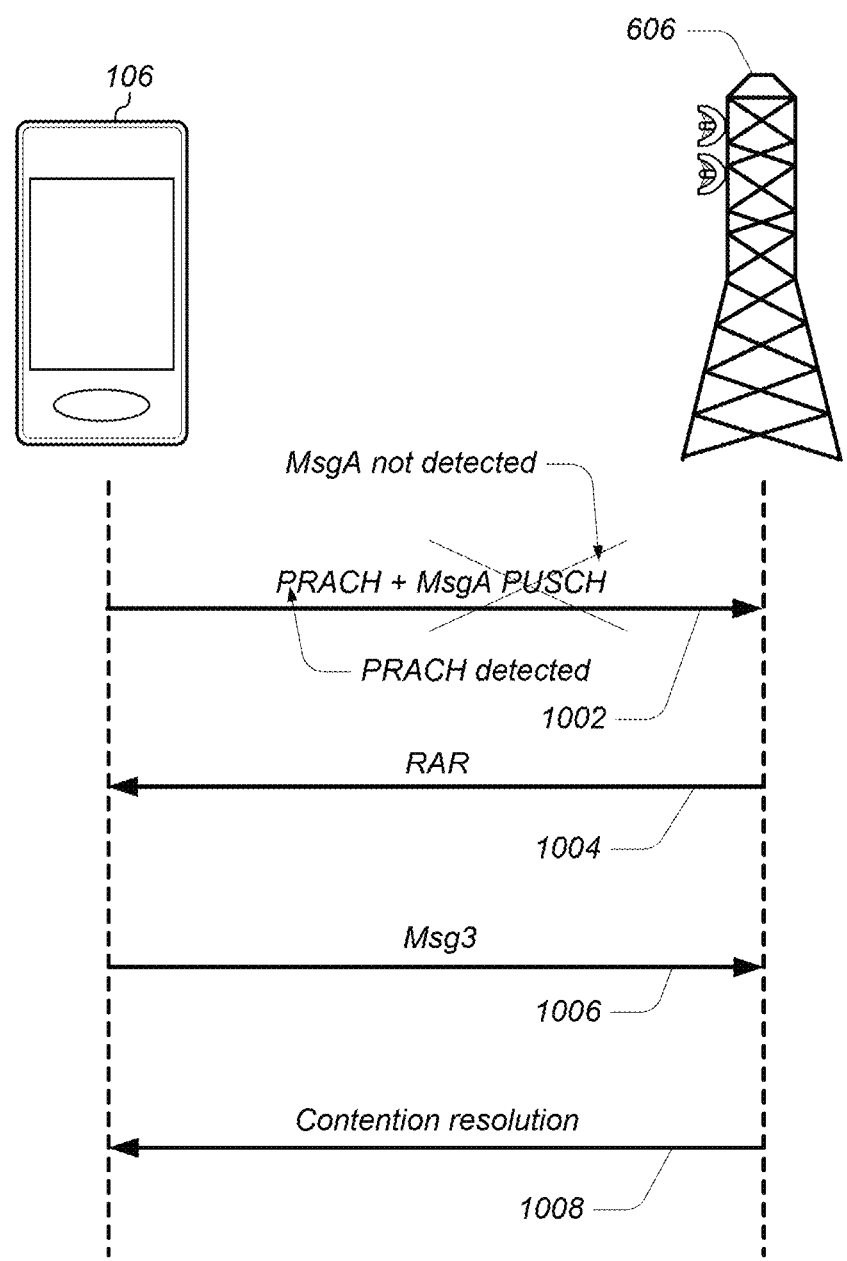
FIG. 8 shows an exemplary signaling diagram illustrating a fallback from a two-step RACH procedure to a 4-step RACH procedure between a base station and a mobile device, according to some embodiments.

As shown in FIG. 8, UE 106 may begin a 2-step RACH procedure with base station 606 by transmitting a PRACH+MsgA PUSCH (1002). While the PRACH is successfully detected by base station 606, the MsgA PUSCH is not detected correctly, and base station 606 may instruct UE 106 via a Random Access Channel Response (RAR) to fall back to a 4-step RACH procedure (1004). The UE may subsequently transmit a Msg3 to base station 606 (1006), which may communicate a contention resolution message to UE 106 (1008) in response. In some embodiments, additional power ramping may be applied to the Msg3 transmission when the Msg3 transmission takes place during a 4-step RACH procedure performed as a fall back from a 2-step RACH procedure, in order to improve the random access performance. In such a case the power ramping for Msg3 transmission may be considered as:

$$f_{b,f,c}(0,l) = \Delta P_{rampup,b,f,c} + \delta_{msg2,b,f,c} + \Delta P_{rampupMsgA,b,f,c},$$

where $f_{b,f,c}(0,l)$ is a closed-loop power control parameter, and $\Delta P_{rampup,b,f,c}$ is configured for a MsgA power ramping step. It should be noted for reference, that examples of various power control parameters are defined in the 3GPP specification, for example in 3GPP TS 38.213, section 7.1.1.

Fifth Issue—RNTI for MsgB Transmission

For a 4-step RACH procedure the RNTI is defined based on a RACH resource. In a 2-step RACH procedure, one RACH resource may be associated with multiple PUSCH resources. Thus, different PUSCH resources may be associated with different MsgB transmissions. Since the process for a 2-Step RACH procedure is different from the process for a 4-Step RACH procedure, in order to differentiate the two procedures, the RNTI for the MsgB transmission in a 2-step RACH procedure may need to be selected/determined to be different from the Random Access RNTI (RA-RNTI) for the Msg2 transmission in a 4-Step RACH procedure. The RNTI therefore has to be defined/determined for the for MsgB transmission, similar to determining/defining the RNTI for an MsgA PUSCH transmission.

Pursuant to the above, a new RNTI may be defined for MsgB transmission, e.g. a MsgB-RNTI. A first option may be to determine the RNTI based on the time and frequency resources associated with the PUSCH, and/or the time and frequency resources associated with the PRACH, and/or a preamble index, and/or uplink carrier type. In some embodiments, the RNTI may be calculated as:

MsgB_RNTI=1+$s$_id+14*$t$_id+14*80*$f$_id+
14*80*8*$ul$_carrier_id, where, s_id indicates the first symbols index of a PUSCH occasion, t_id indicates the first slot index of a PUSCH occasion within a frame, f_id refers to the index of frequency domain resources associated with the PUSCH, and ul_carrier_id denotes the carrier type, for example a Normal Uplink (NUL) carrier or Supplementary Uplink (SUL) carrier. A second option may include configuring the RNTI by RRC, while a third option may include a combination of the first and second options, where the RNTI may be determined by an RRC parameter and/or by the time and frequency resources associated with the PUSCH, and/or by time and frequency resources associated with the PRACH, and/or by the preamble index.

Furthermore, when a new RNTI is defined for MsgB, the dynamic presence of PT-RS associated with the MsgB transmission may also be predefined such that PT-RS may either be present or not present. For example, according to a first option, the UE may be configured to assume that no PT-RS is present if the RNTI (value) equals MsgB-RNTI. For example, in reference to the 3GPP Technical Specification 38.214, v15.6.0, section 5.1.6.3, when a UE is configured with the higher layer parameter phaseTrackingRS in DMRS-DownlinkConfig, and the RNTI equals MsgB-RNTI, the UE may assume that PT-RS is not present. According to a second option, the UE may be configured to assume presence of the PT-RS if the RNTI (value) equals MsgB-RNTI. For example, again in reference to the 3GPP Technical Specification 38.214, v15.6.0, section 5.1.6.3, when a UE is configured with the higher layer parameter phaseTrackingRS in DMRS-DownlinkConfig, the UE may assume the PT-RS is present when the RNTI equals MsgB-RNTI.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a processor configured to:
determine, based at least on time and frequency resources associated with a physical random access channel (PRACH), a first radio network temporary identifier (RNTI) associated with a first message to be transmitted by a device on a physical uplink shared channel (PUSCH), wherein no phase tracking reference signal (PT-RS) is to be present on the PUSCH for the first message in accordance with the first RNTI;
cause the device to wirelessly transmit to a base station:
information on the PRACH; and
the first message on the PUSCH; and
cause the device to receive, from the base station, either one of:
a second message on a physical downlink shared channel (PDSCH) if the first message is successfully decoded, wherein the second message is associated with a second RNTI, different from the first RNTI, wherein the second RNTI is based at least on the time and frequency resources associated with the PRACH, and wherein no PT-RS is present on the PDSCH for the second message in accordance with the second RNTI; or
a random access channel (RACH) fallback indication.

2. The apparatus of claim 1, wherein the processor is further configured to provide the device with one or more opportunities to transmit the first message, wherein one of the one or more opportunities includes one or more PUSCH resource units (PRUs).

3. The apparatus of claim 2, wherein one or more of a first set of communication parameters for the device are configured to be common for each opportunity of the one or more opportunities, and/or wherein one or more of a second set of communication parameters for the device are configured per PRU.

4. The apparatus of claim 3,
wherein the first set of communication parameters includes one or more of:
modulation and coding scheme (MCS) table parameters;
periodicity parameters;
offset parameters;
demodulation reference signal (DMRS) configuration parameters;
waveform parameters;
power control parameters; or
timer parameters; and/or
wherein the second set of communication parameters includes one or more of:
MCS parameters;
antenna port parameters;
DMRS scramble ID parameters;
frequency resource allocation and associated PRACH resource parameters.

5. The apparatus of claim 1,
wherein the first RNTI is determined based on one or more of:
time and frequency resources associated with the PUSCH;
time and frequency resources associated with the PRACH; or
a preamble index; and
wherein the second RNTI is determined based on one or more of:
the time and frequency resources associated with the PUSCH;
the time and frequency resources associated with the PRACH;
the preamble index; or
uplink carrier type.

6. The apparatus of claim 1, wherein the first RNTI is determined through radio resource control (RRC), and/or the second RNTI is determined through RRC.

7. The apparatus of claim 1,
wherein the first RNTI value is calculated according to a hash function of:
a first symbols index of resources associated with the PUSCH;
a slot index of the PUSCH within a transmission frame;
a first resource block index of the resources associated with the PUSCH; and
a preamble index the device uses to transmit PRACH; and
wherein the second RNTI value is calculated according to a function of:
a first symbols index of an occasion of the PUSCH;
a first slot index of an occasion of the PUSCH within a frame;
an index of frequency domain resources associated with the PUSCH; or
carrier type.

8. The apparatus of claim 1, wherein the processor is further configured to:
cause the device to use the first RNTI as a cell-RNTI in idle mode following a RACH procedure.

9. The apparatus of claim 1, wherein the second message indicates a cell RNTI to the device.

10. The apparatus of claim 1, wherein the processor is further configured to:
cause the device to drop one of the first message or the PRACH when a collision between the first message and the PRACH occurs in different component carriers.

11. The apparatus of claim 1, wherein the processor is further configured to:
cause the device to drop one or more uplink signals when a collision between the first message and the one or more uplink signals occurs in different component carriers.

12. The apparatus of claim 1, wherein the processor is further configured to:
when a collision between the first message and a physical uplink control channel (PUCCH) occurs in a same component carrier, cause the device to perform one of:
drop the PUCCH;
drop the first message; or
transmit uplink control information in the PUSCH.

13. The apparatus of claim 1, wherein the processor is further configured to:
cause the device to drop one of the first message or a sounding reference signal (SRS) when a collision between the first message and the SRS occurs in a same component carrier.

14. The apparatus of claim 1, wherein the first message and an uplink message that is part of a third step of the 4-step RACH procedure share the same control parameters.

15. A device comprising:
radio circuitry configured to facilitate wireless communications of the device over a wireless network; and
a processor communicatively coupled to the radio circuitry and configured to interoperate with the radio circuitry to:
determine, based at least on time and frequency resources associated with a physical random access channel (PRACH), a first radio network temporary identifier (RNTI) associated with a first message to be transmitted on a physical uplink shared channel (PUSCH), wherein no phase tracking reference signal (PT-RS) is to be present on the PUSCH for the first message in accordance with the first RNTI;
wirelessly transmit to a base station:
information on the PRACH; and
the first message on the PUSCH; and
receive, from the base station, either one of:
a second message on a physical downlink shared channel (PDSCH) if the first message is successfully decoded, wherein the second message is associated with a second RNTI, different from the first RNTI, wherein the second RNTI is based at least on the time and frequency resources associated with the PRACH, and wherein no PT-RS is present on the PDSCH for the second message in accordance with the second RNTI; or
a random access channel (RACH) fallback indication.

16. The device of claim 15, wherein the device is configured with one or more opportunities to transmit the first message, wherein one of the one or more opportunities includes one or more PUSCH resource units (PRUs); and
wherein one or more of a first set of communication parameters for the device are configured to be common for each opportunity of the one or more opportunities, and/or wherein one or more of a second set of communication parameters for the device are configured per PRU.

17. The device of claim 15, wherein the processor is configured to further interoperate with the radio circuitry to drop one of the first message or the PRACH when a collision between the first message and the PRACH occurs in different component carriers.

18. A non-transitory memory element storing instructions executable by a processor to:
determine, based at least on time and frequency resources associated with a physical random access channel (PRACH), a first radio network temporary identifier (RNTI) associated with a first message to be transmitted by a device on a physical uplink shared channel (PUSCH), wherein no phase tracking reference signal (PT-RS) is to be present on the PUSCH for the first message in accordance with the first RNTI;
cause the device to wirelessly transmit to a base station:
information on the PRACH; and
the first message on the PUSCH; and
cause the device to receive, from the base station, either one of:
a second message on a physical downlink shared channel (PDSCH) if the first message is successfully decoded, wherein the second message is associated with a second RNTI, different from the first RNTI, wherein the second RNTI is based at least on the time and frequency resources associated with the PRACH, and wherein no PT-RS is present on the PDSCH for the second message in accordance with the second RNTI; or
a random access channel (RACH) fallback indication.

19. The non-transitory memory element of claim 18, wherein the instructions are executable by the processor to perform, when a collision between the first message and a physical uplink control channel (PUCCH) occurs in a same component carrier, one of:
cause the device to drop the PUCCH;
cause the device to drop the first message; or
cause the device to transmit uplink control information in the PUSCH.

20. The non-transitory memory element of claim 18, wherein the instructions are executable by the processor to:
cause the device to drop one of the first message or a sounding reference signal (SRS) when a collision between the first message and the SRS occurs in a same component carrier.

\* \* \* \* \*